US010657140B2

(12) United States Patent
Abou Mahmoud et al.

(10) Patent No.: US 10,657,140 B2
(45) Date of Patent: May 19, 2020

(54) SOCIAL NETWORKING AUTOMATIC TRENDING INDICATING SYSTEM

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 15/149,267

(22) Filed: May 9, 2016

(65) Prior Publication Data

US 2017/0322980 A1 Nov. 9, 2017

(51) Int. Cl.
*G06F 16/2457* (2019.01)
*G06F 16/248* (2019.01)
*H04L 29/08* (2006.01)

(52) U.S. Cl.
CPC ...... *G06F 16/24575* (2019.01); *G06F 16/248* (2019.01); *H04L 67/22* (2013.01); *H04L 67/306* (2013.01)

(58) Field of Classification Search
CPC . G06F 16/24575; G06F 16/248; H04L 67/22; H04L 67/306
See application file for complete search history.

(56) References Cited

U.S. PATENT DOCUMENTS

| | | | |
|---|---|---|---|
| 6,546,390 B1 | 4/2003 | Pollack et al. | |
| 8,990,097 B2 | 3/2015 | Spivack et al. | |
| 2011/0066532 A1* | 3/2011 | Schonberg | G06Q 40/00 705/35 |
| 2011/0238615 A1* | 9/2011 | Sinha | G06Q 30/02 706/52 |
| 2013/0275527 A1 | 10/2013 | Deurloo | |
| 2014/0075004 A1* | 3/2014 | Van Dusen | H04L 41/04 709/223 |
| 2014/0101159 A1 | 4/2014 | Lloyd et al. | |
| 2014/0149885 A1 | 5/2014 | Wilder et al. | |
| 2014/0207962 A1* | 7/2014 | Makofsky | H04L 65/60 709/231 |
| 2014/0229492 A1 | 8/2014 | Buddenbaum et al. | |
| 2014/0229571 A1 | 8/2014 | Buddenbaum et al. | |
| 2014/0358891 A1 | 12/2014 | Anstandig et al. | |

(Continued)

OTHER PUBLICATIONS

Abou Mahmoud et al., "Identifying Relevant Content Contained in Message Streams That Appear to Be Irrelevant", U.S. Appl. No. 14/943,396, filed Nov. 17, 2015, 23 pages.

(Continued)

*Primary Examiner* — Shahid A Alam
*Assistant Examiner* — Andalib F Lodhi
(74) *Attorney, Agent, or Firm* — Edward J. Wixted, III

(57) ABSTRACT

Systems, methods and/or software for identifying relevancy and trending among multiple messages in a social networking context. Topics that are of interest and/or relevant to a user are classified based on factors including frequency and trending behavior. Alert indicators, such as color-coded "sparklines" are generated and displayed close to the associated messages, to attract appropriate levels of attention from the user. The alert indicators are regularly updated to reflect trending changes, in near real time, as they occur.

20 Claims, 6 Drawing Sheets

(56) References Cited

U.S. PATENT DOCUMENTS

2015/0035836 A1 2/2015 Mifflin
2015/0244656 A1 8/2015 Choi et al.
2017/0186102 A1* 6/2017 Di .......................... G06Q 50/01

OTHER PUBLICATIONS

Kumar et al. ,"TweetTracker: An Analysis Tool for Humanitarian and Disaster Relief", Proceedings of the Fifth International AAAI Conference on Weblogs and Social Media, Copyright © 2011, Association for the Advancement of Artificial Intelligence, 2 pages.
"Sparkline", Wikipedia, the free encyclopedia, page last modified on Feb. 29, 2016, at 10:51, 2 pages, (https://en.wikipedia.org/wiki/Sparkline>.

* cited by examiner

SOCIAL NETWORKING AUTOMATIC TRENDING INDICATING SYSTEM

BACKGROUND

The present invention relates generally to the field of presentation of trending information related to social networking activities.

Social networks are mechanisms widely used to connect people and information in logical and organized ways which enable sharing and processing of information between the users. Social networking systems include instant messaging (IM) services, short message services (SMS), web logs (blogs), web sites including community-based web sites, news feeds, email services, voice over internet protocol (VoIP), software phones, etc. Common mechanisms of sharing and processing information in social media include: (i) the inbox (for incoming email messages); (ii) the "wall" (a user's profile space where the user's content is displayed, and messages are posted for the user to see); (iii) activity-stream (see definition in the Definitions sub-section of the Detailed Description section below); (iv) timeline (a type of display listing events in chronological order in a social media virtual space, in which a user's content is organized and shown); and (v) user profile (a visual display of personal data associated with a specific user, or a customized desktop environment). These mechanisms enable users to rapidly share and gather information among other users in the social networks.

SUMMARY

According to an aspect of the present invention, there is a method, computer program product and/or system that performs the following operations (not necessarily in the following order): (i) receiving a machine readable activity-stream data set that includes (a) a plurality of user-centric data items relating to a first user, and (b) a plurality of trend data sets respectively associated with the user-centric data items, with each trend data set being indicative of trending information for the respectively associated activity-stream item; and (ii) creating a machine executable display data set corresponding to a visual presentation displayable by a display device, with the visual presentation including: (a) a visual indication of the user-centric data item of the plurality of user-centric data, with at least some of the user-centric data relating to the first user, and (b) a visual indication of the trending information for each of the respectively corresponding user-centric data of the plurality of activity-stream items, with at least some of the activity-stream items including user-centric data relating to the first user.

DETAILED DESCRIPTION

Figure 1:
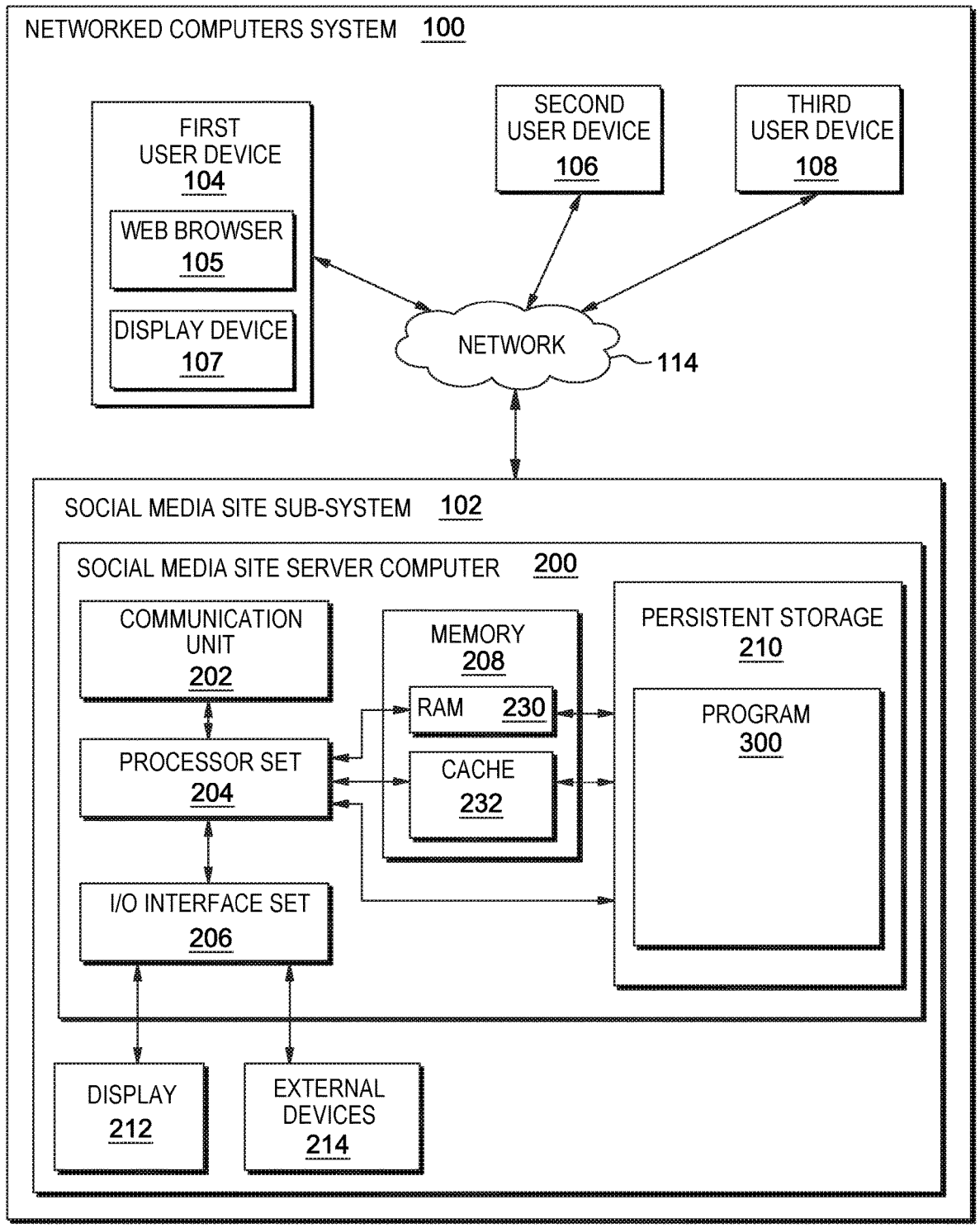
FIG. 1 is a block diagram of a first embodiment of a system according to the present invention.

Some embodiments of the present invention are directed to systems, methods and/or software for identifying relevancy and trending among multiple messages in a social networking context. Topics that are of interest and/or relevant to a user are classified based on factors including frequency and trending behavior. Alert indicators, such as color-coded sparklines (see definition below, in the Definitions sub-section of this Detailed Description) are generated and displayed in close visual proximity to the associated messages, to attract appropriate levels of attention from the user. The alert indicators are regularly updated to reflect trending changes, in near real time, as they occur. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: social media site sub-system 102; first user device 104; second user device 106; third user device 108; communication network 114; social media site server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
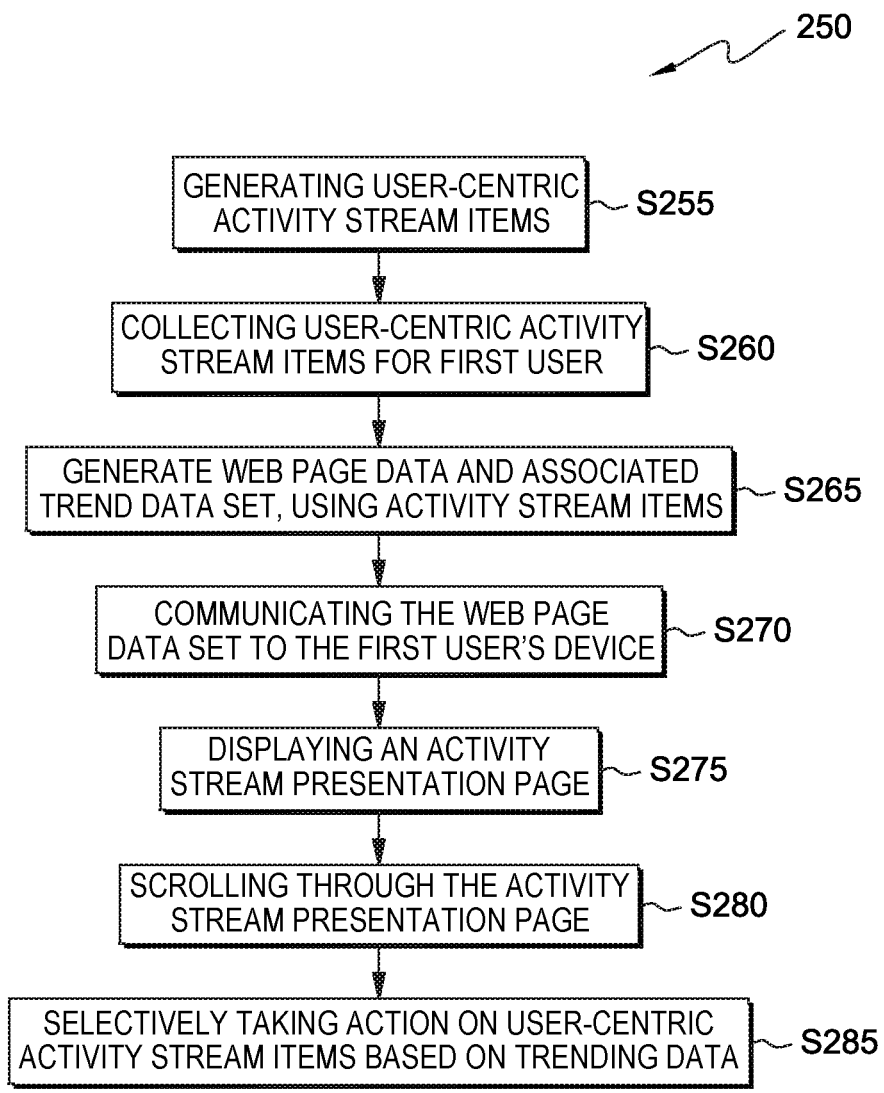
FIG. 2 is a flowchart showing a first embodiment method performed, at least in part, by the first embodiment system.
Figure 3:
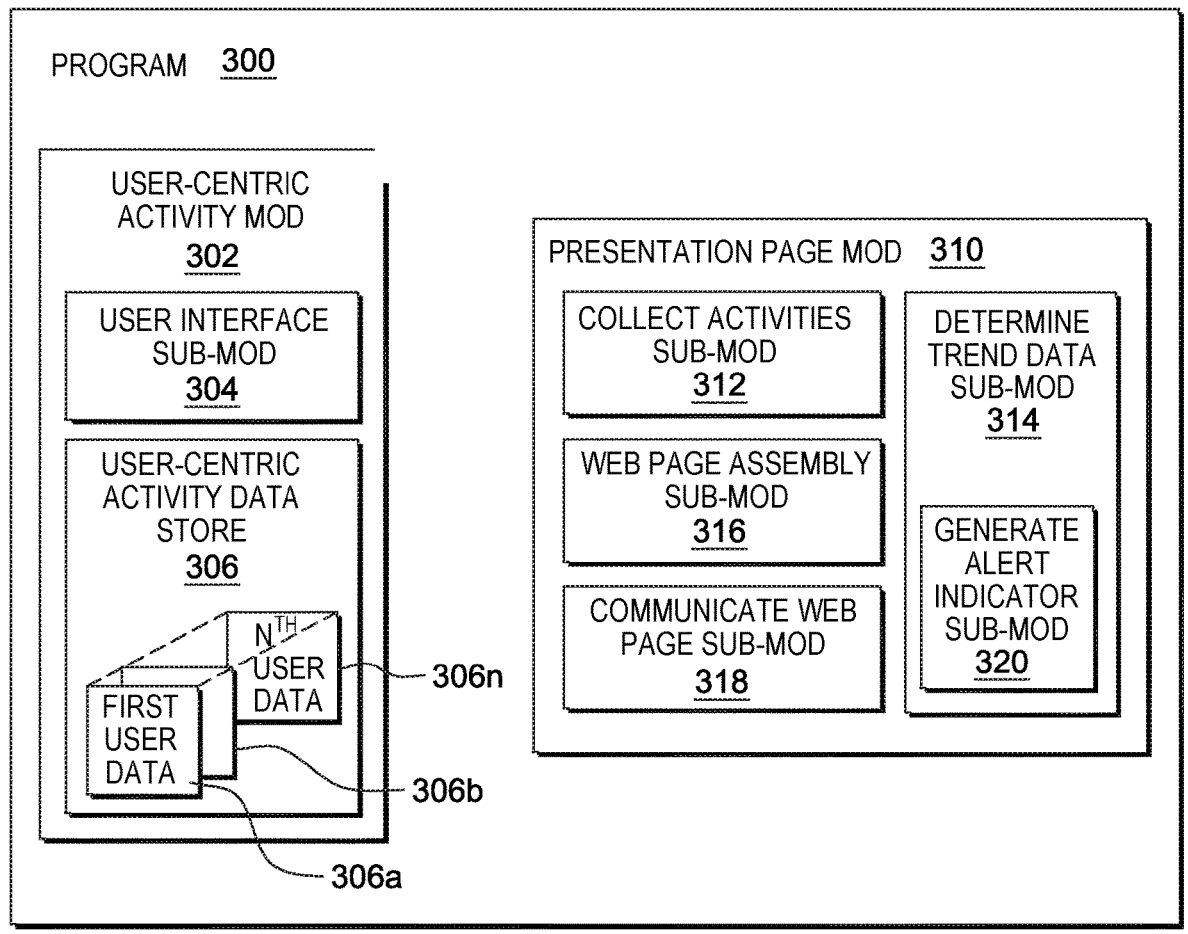
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where user-centric activity module 302 generates a user-centric activity-stream. A user-centric (see definition below, in the Definitions section of this detailed Description section) activity-stream is a record of user interactions of a first user (not shown in the Figures), through user interface sub-module 304, of user-centric activity module 302. The first user makes use of first user device 104, of networked computers system 100 of FIG. 1, to interact with web browser 105, of the first user device, to receive fourteen emails and send replies to two of the emails. The first user proceeds to visit thirty-four web pages among four web sites, makes and reads a variety of postings on two social-networking web-logs (blogs), and conducts a variety of other interactions with three social media web-sites. The first user interacts with the web browser, in part through display device 107 of the first user device. Each interaction with respect to the user's social media activities, (for example, each email sent, or received, each blog post read or posted, the universal resource locator (URL) of each web-page visited by the user, etc.) is recorded as part of the first user's user-centric activity-stream.

User-centric activity-stream items can include items having varying degrees of relevancy with the user. Examples of user-centric activities that are strongly relevant to the user include: (i) messages sent by, or addressed to the user, and messages created in response thereto; (ii) messages regarding the user; (iii) messages concerning user-defined topics of interest; (iv) messages concerning user's work colleagues, and family members; and/or (v) messages about things for which the user has responsibilities (for example, the user's job responsibilities).

Examples of user-centric activity, that are less strongly relevant to the user, include: (i) web-log (blog) posts directed to or posted by the user; (ii) blog or micro-blog posts made in web logs "owned", and/or "followed" by the user; and/or (iii) general social networking activities only tangentially connected to the user.

The strength of relevancy of an activity stream item to a user is an implementation-specific aspect of some embodiments of the present invention. In some embodiments, a user-defined threshold relevancy strength is used to determine whether an activity-stream item is relevant to the user. For example, a threshold strength may be derived, based on user responses to questions posed by the embodiment, where the questions are designed to elicit information useful for determining the threshold relevancy strength. Alternatively, a threshold relevancy strength may be derived by a cognitive type of computing system, based on various and wide-ranging input data.

An example to illustrate different relevancy strengths follow. Consider a student, user-A, who studies at a university and is a member of the university's football team. User-A shares an apartment with user-B, who does not play football, but attends the university's home football games. A flurry of news feed items about a recent game appears in user-A's activity-stream after a game in which user-A performed exceedingly poorly. In some embodiments, the news feed items would be determined to be relevant to user-A, and would be flagged with alert indicators. User-A's attention, is drawn quickly to the news-feed items by alert indicators. User-A, in consultation with the team coaches, develops an enhanced training program to address the weaknesses written about in the news feeds.

User-B attends the game and receives the same news feed activity-stream items as user-A received. Although tangentially relevant to user-B, due to both user's shared living quarters, the relevance strength of the news feeds items relating to user-A's performance does not rise to a threshold level in user-B's activity-stream. The news feeds, therefore, are not flagged with alert indicators in user-B's activity-stream.

Alternatively, in some embodiments of the present invention, a user, may make use of multiple devices (for example, using a smartphone to interact with a popular social networking web site, a laptop computer to process emails, and a tablet computer to conduct general web browsing) to conduct interactions with social media. Without regard to which device the user uses, the events and interactions that take place are recorded as part of the user's user-centric activity-stream. The user-centric activity-stream may be aggregated into a single web page, or it may be distributed among several web pages and summarized on a single web page. In some embodiments, a single web page, containing a summary of the user-centric activity-stream, contains web links to various other web pages where each link points to an element of the activity-stream.

Processing proceeds to operation S260, where collect activities sub-module 312 of presentation page module 310, collects user-centric activity-stream items (not shown in the Figures) for the first user. Collectively, the user-centric activity-stream items make up the user-centric activity-stream. Collect activities sub-module 312 stores the collected user-centric activity steam items in user-centric activity data store 306, of user-centric activity module 302. More specifically, user-centric activity-stream items for the first user are stored as first user data 306a. User-centric activity-stream items for other users (a second user through an n$^{th}$ user) are stored respectively in user data 306b, through 306n.

Processing proceeds to operation S265, where web page assembly sub-module 316, of presentation page module 310, generates a web page data set (not shown in the Figures), based on activity-stream of the first user. Determine trend data sub-module 314 of presentation page module 310, determines if trending data merits generation of an alert indicator, based on trending of activity-stream items that are determined to be user-centric with regard to the first user.

In some embodiments, each activity-stream item is evaluated using conventional methods, to determine relevancy, and in turn, whether each respective item is to be flagged with an alert indicator.

Processing proceeds to operation S270 where communicate web page sub-module 318, of presentation page module 310, sends the web page data set to first user device 104 (see FIG. 1) where the web page data set, including the alert indicator, is rendered as a web page on the first user device.

Processing proceeds to operation S275 where user interface sub-module 304, of program 300, renders and displays the web page data set as an activity-stream presentation page (not shown in the Figures) on display device 107 of first user device 104.

Processing proceeds to operation S280, where the first user scrolls through the activity-stream presentation page. The activity-stream is longer than can be displayed all at once on the display device. As the first user scrolls through the activity-stream, an alert indicator present in the activity-stream calls the user to focus more attention on the activity-stream element flagged by the alert indicator.

Processing proceeds to operation S285, where the first user, upon scrolling through the activity-stream presentation page: (i) sees the alert indicator in close proximity to the important item in the activity-stream; (ii) inspects the important item; (iii) concludes that the item indicates a cause of action by the user is needed; and/or (iv) takes an action in response to information presented in the important item.

In some embodiments of the present invention, an alert indicator may be a link element, which can invoke certain program functions. For example, clicking on an alert indicator may re-sort the activity-stream, bringing together all items in the activity-stream that pertain to the subject of the item associated with the alert indicator. Alternatively, clicking on the alert indicator can open a drop-down menu offering options such as "Mark this subject resolved", "Delete items of this subject", "Go to first item on this subject", etc.

Figure 4A:
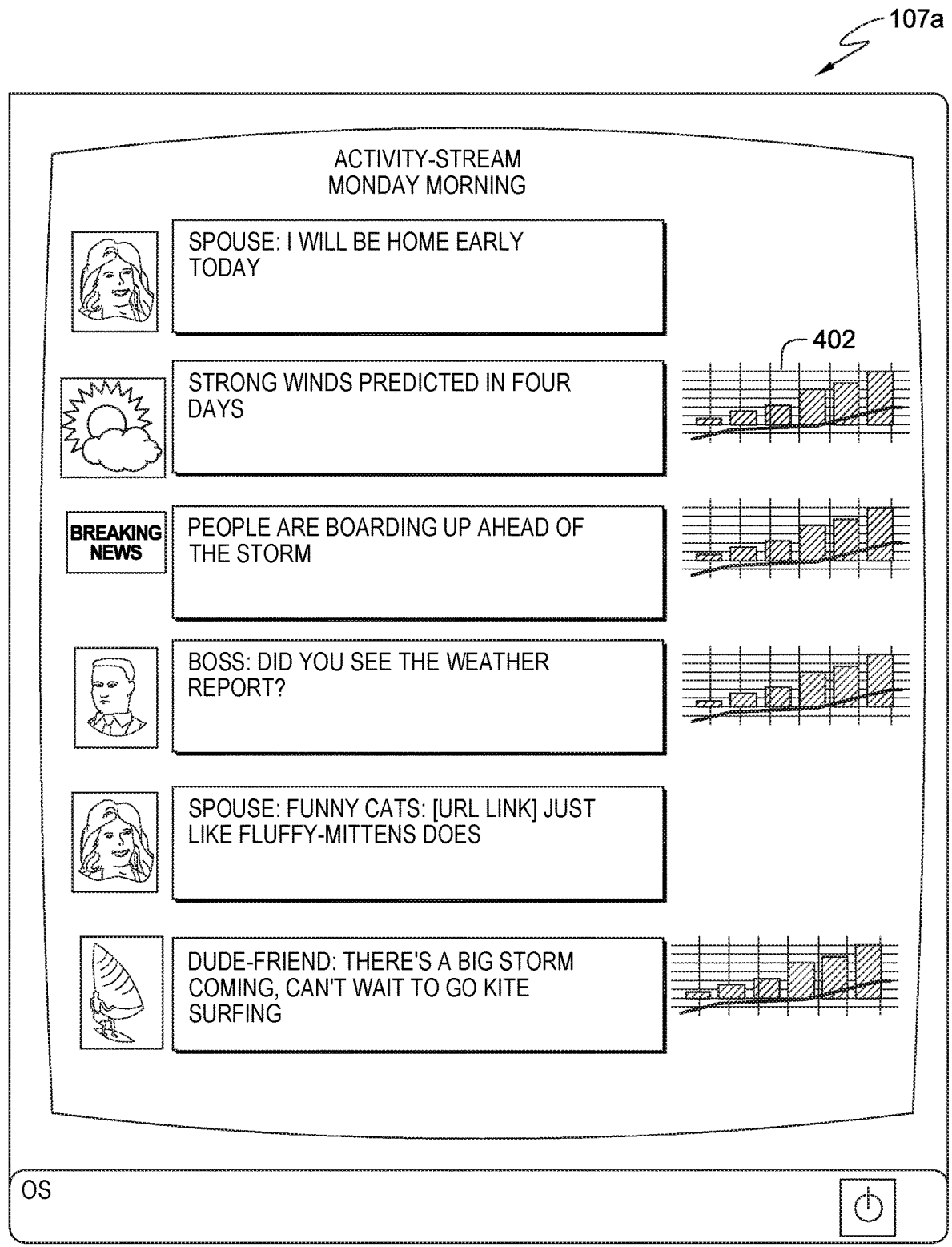
FIG. 4A is a first screenshot generated by a second embodiment system.

An illustrative example scenario is discussed in the few paragraphs below, with reference to the screenshots of FIGS. 4A, 4B, and 4C. In this scenario, (referring first to screenshot 107a) a user is a supply chain manager for a lumber retailer. It is currently Monday. Included in the manager's activity-stream (screenshot 107a), as displayed on user device 104, are a mix of items, including those concerning the topic of high winds that are predicted to occur the coming Friday. Discussion of the predicted high winds begins trending upward. Determine trend data sub-module 314 detects the trending topic of the predicted high winds. Generate alert indicator sub-module 320, of determine trend data sub-module 314, generates upwardly trending alert indicator 402 related to the topic of the predicted high winds. Web page assembly sub-module 316, of presentation page module 310, adds the alert indicator to the web page data set. The web page data set is sent to the first user device. The alert indicator is designed to call attention to an item, in the activity-stream, which item is determined to be important to the user. In the present example, the alert indicator is designed to call attention to the upwardly trending topic of the high-wind prediction. The activity-stream, including upwardly trending alert indicator 402 are presented for the user to see.

Continuing with the present example, the supply-chain manager's attention is drawn to the topic of the predicted high winds, by upwardly trending alert indicator 402 displayed in the user's activity-stream. Copies of the alert indicator are positioned in close proximity to their respective activity-stream items, each of which bears a relationship to the subject of the predicted high winds. In response, the user (the supply chain manager) immediately places orders for expedited delivery, with various wholesalers, for plywood, screws, ladders, and cordless impact driver power tools. Due to the quick action, the manager is able to bolster the lumber retailer's inventory in time to meet a sudden increase in demand.

Figure 4B:
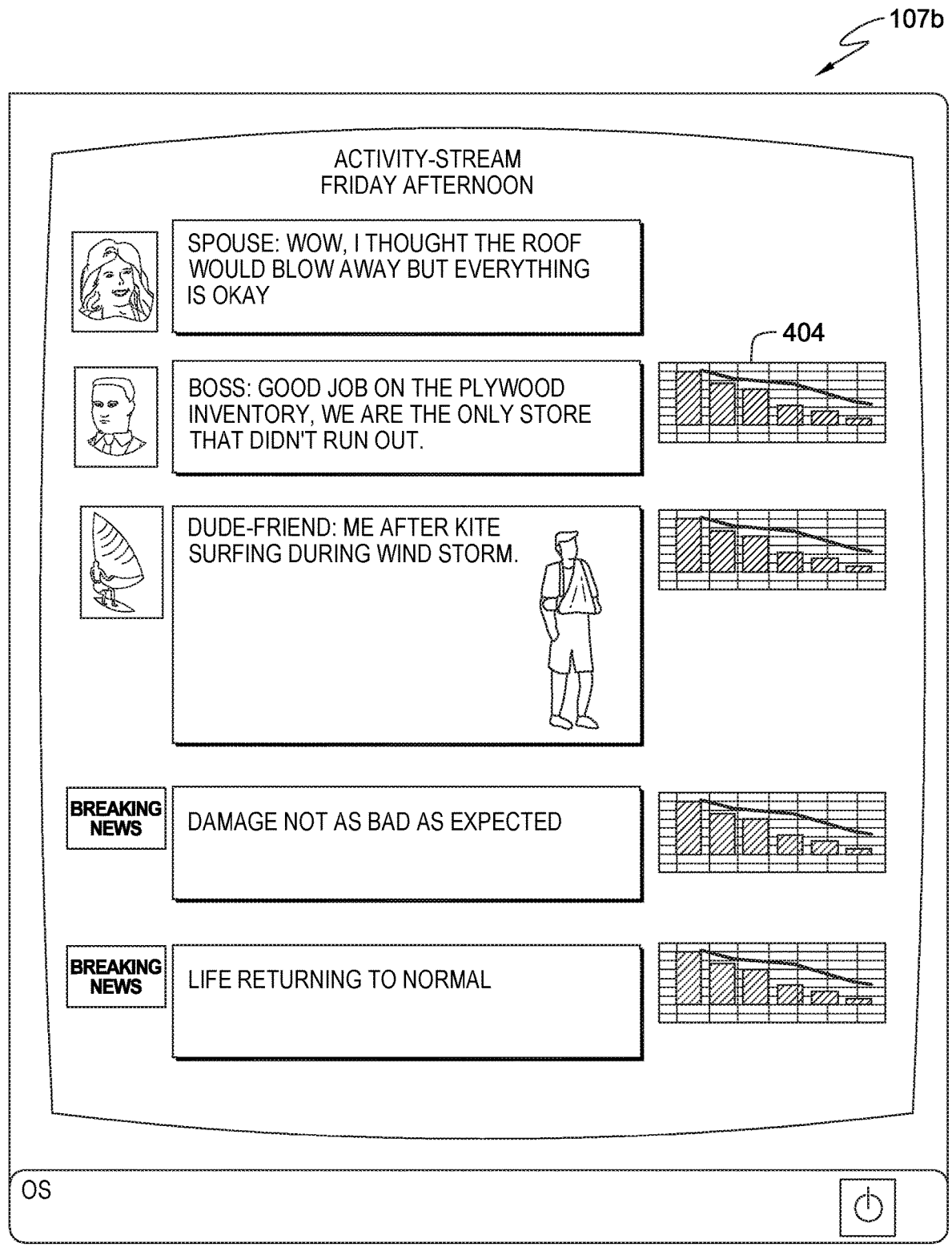
FIG. 4B is a second screenshot generated by the second embodiment system.
Figure 4C:
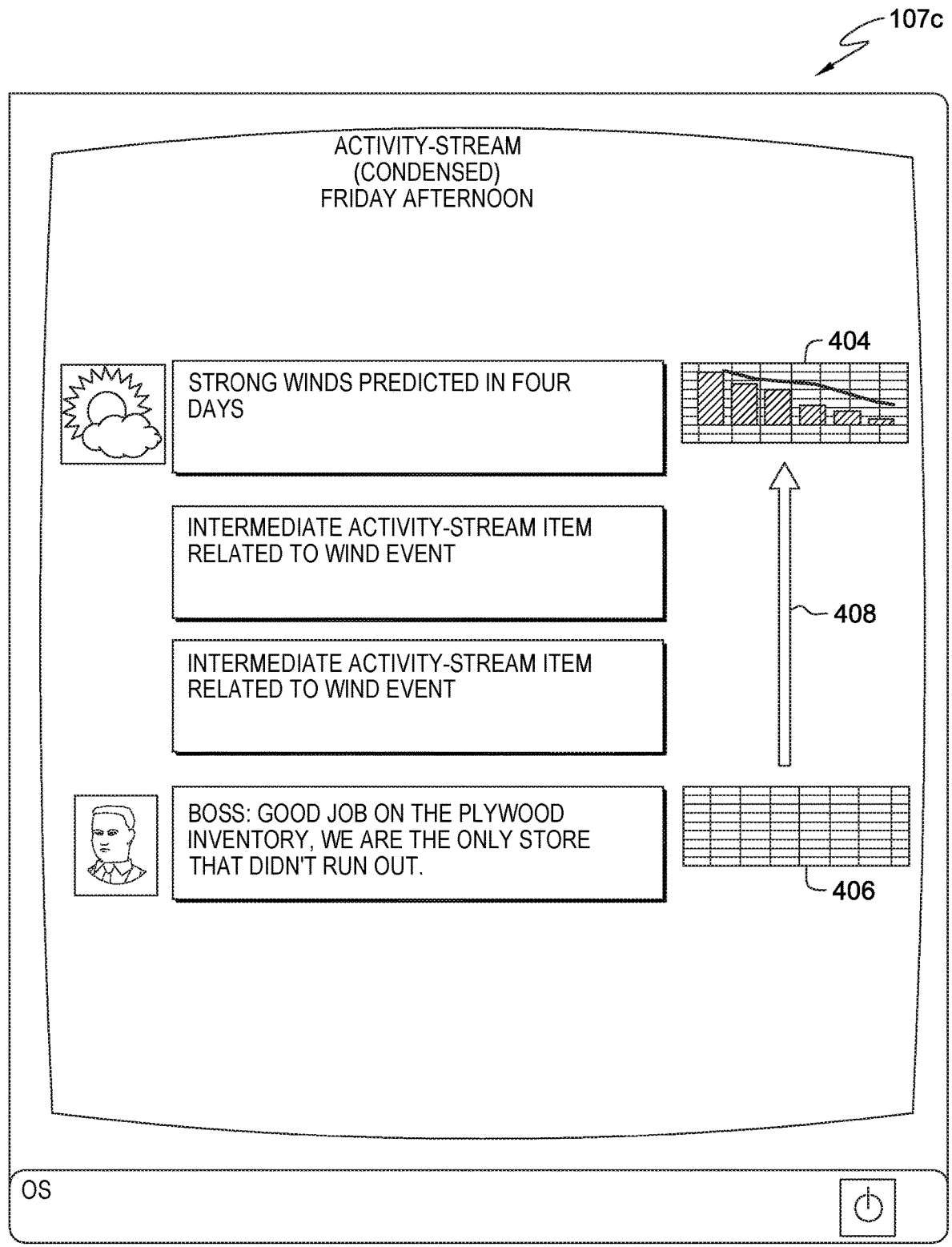
FIG. 4C is a third screenshot generated by the second embodiment system.

The user's activity-stream as shown in screenshot 107b of FIG. 4B, represents the user's activity-stream on Friday, after the winds have diminished and the high-wind episode has ceased to be of concern. Trending on the topic declines, and the alert indicators, corresponding to each respective item in the activity-stream, are updated to indicate the downward trend of the weather topic (see downwardly trending alert indicator 404).

On Friday, the supply-chain manager receives an email from the boss, expressing thanks for having effectively managed the inventory throughout the weather event. The boss's message is identified as resolution of the high-wind episode, and is indicated by non-trending alert indicator 406, of screenshot 107c, of FIG. 4C.

In some embodiments of the present invention, the user clicks on the non-trending alert indicator, and in response, the activity-stream is re-configured and displayed in a condensed fashion, including, the first and last items determined to be related to the high-wind episode, which are displayed in a single screen display, with an arrow icon 408 displayed between the corresponding alert indicators 406 and 404. The supply-chain manager is thus given a clear linking of the issue (an upcoming surge in demand) and its resolution (the end of the episode).

Another illustrative example scenario is discussed below in the Further Comments and/or Embodiments sub-section of this Detailed Description section.

III. Further Comments and/or Embodiments

Some embodiments of the present invention recognize the following facts, potential problems and/or potential areas for improvement with respect to the current state of the art: (i) sometimes a user is overwhelmed by the massive amount of information displayed in the activity-stream; (ii) the user is not able to easily draw clear conclusions on what message should be focused on and responded to; (iii) interesting and/or critical information is not highlighted or otherwise distinguished from non-interesting and non-critical information; (iv) as shown in the sample screenshots below, all the entries are displayed with text; and/or (v) the user does not necessarily have the time or patience to sift through, or read through all the information.

In some embodiments of the present invention, a color attribute is used to indicate different trends and the system is configurable to accommodate a user's preferences. For example, in some embodiments of the present invention: (i) green indicates things are proceeding in a preferred direction and that no user action is required; (ii) blue indicates things that require some attention from the user; and/or (iii) red indicates things that require user's attention and action.

Some embodiments of the present invention include the following operations, not necessarily in the order presented: (i) scan the user's profile data (including such data as job role, demographics, expertise and hobby, etc.); (ii) monitor message(s) displayed in the user's activity-stream; (iii) determine which message(s) are of importance (that is, relevant) to the user; (iv) apply pre-defined rules and color coding to a trend indicator; (v) display the trend indicator, spatially near (for example, adjacent to) the corresponding message; (vi) continue to monitor incoming messages; and/or (vii) re-display messages when certain messages are identified as correlated. Further to item (v) above, the display is scrollable, in vertical and/or horizontal directions.

In some embodiments of the present invention, additional visual cues are added to the activity-stream display. For example, if an issue is resolved and the user's attention is determined as no longer needed, then an arrow icon is displayed between an earlier message related to the issue and a message indicating successful resolution of the issue.

Some embodiments of the present invention sort the activity-stream, based on negatives and positives. For example, an upward trend concerning a negative topic (such as a production problem) is displayed differently (to attract attention of appropriate staff members) than a downward trend of the negative topic. Conversely, an upward trend of a positive topic, for example positive consumer reaction to a new advertising campaign is displayed differently than negative consumer reaction is displayed.

For example, entries in an activity-stream are automatically sorted. If the user clicks on a spike line in a graph, the activity-stream is re-sorted and re-displayed according to user-defined parameters. In some embodiments of the present invention, activity-stream entries are ordered based on their status as indicated by the colors of the sparklines (for example in the order: green, blue, red).

Some embodiments of the present invention pivot the activity-stream based on a user-selected portion of the sparkline graph. If a user clicks on a green sparkline associated with a message, all the messages related to associated message are displayed. This feature can be understood to be real time filtering in the activity-stream. Some embodiments sort only the active view.

Other embodiments sort all messages that are associated with a selected time interval. For example, if a user selects a negative portion of a conversation, the user is brought to messages which logically surround the message at the time of selection (based on, for example, time of creation, popularity, etc.).

Some embodiments of the present invention provide visual cues showing information that is relevant to the user's interests and activities, about message trending in the social networking website.

Some embodiments of the present invention may include one, or more, of the following features, characteristics and/or advantages: (i) intelligently analyzes information (including messages) that is relevant to a user; (ii) provides visual cues that indicate trending of the message flow; (iii) enables the user to act on messages based on the trend indicator; (iv) helps the user efficiently filter, read, and/or understand a large volume of information displayed in an activity-stream; (v) provides visual cues to directly indicate a trend; (vi) presents results in a compact format; and/or (vii) generates social networking data for each individual user's activity-stream and displays the graphs in close visual proximity to the associated text (enabling the user quickly to recognize and/or react to action items).

Some embodiments of the present invention may include one, or more, of the following features, characteristics and/or advantages: (i) identifies relevant correspondence trends with an annotation that uses different colors to denote respective trends; (ii) identifies multiple messages according to a topic of relevancy and/or interest to a user in a social networking system; (iii) classifies multiple messages based on frequency and trend assessments; (iv) applies color coding rules to determine a color indicating the frequency and trend assessment for individual messages; (v) displays a color-based indicator near a message indicating the trend assessment for the message; and (vi) updates the color-based indicator based on resolution criteria.

Some embodiments of the present invention take into consideration certain factors which are helpful in automatically determining whether to flag a message, within the user's activity-stream, for attention by the user. These factors include: (i) role(s) played by the user; (ii) responsibilities of the user; (iii) relevancy, of content in the activity-stream, to the user's roles and responsibilities; and/or (iv) relationship between various messages within the activity-stream.

Some embodiments of the present invention may include one, or more, of the following features, characteristics and/or advantages: (i) uses different colors to present trending topics to get the user's attention; (ii) intelligently analyzes information that is relevant to the user; (iii) provides alerts to indicate the trend of the message flow; and (iv) enables the user to quickly focus on a subset of the massive information displayed in the activity-stream, that is interesting and/or critical to the user.

Further with respect to item (iii) in the paragraph above, alerts that indicate the trend of the message flow can take various forms, including, without limitation: (i) displaying a color-coded (or non-color coded) indicator (for example, a sparkline) in close visual proximity to the corresponding message, on the user's display device; (ii) sounding a signal that is audible to the user; (iii) generating a vibration perceivable by the user; and/or (iv) generating any combination of alerting stimuli, currently existing or that may be developed in the future, that is perceivable by the user and designed to draw the user's attention to the corresponding message.

In some embodiments of the present invention, certain pre-conditions trigger an alert to the user. Such pre-conditions include: (i) a message in the activity-stream is related to a role played by the user; (ii) a message in the activity-stream is related to a responsibility of the user; (iii) content in the activity-stream is relevant to the user; (iv) relevant relationships are determined to exist among various messages within the activity-stream; (v) a message in the activity-stream originated from a user identified as having priority (for example, the user's family member, a business partner, the user's department manager, etc.); and/or (vi) a message in the activity-stream is related to a message previously flagged by the user as being of particular interest.

Some embodiments of the present invention may include one, or more, of the following features, characteristics and/or advantages: (i) analyzes the relevancy to the user of incoming messages; and (ii) determines whether user action needs to be taken.

Some embodiments of the present invention: (i) scan profile data to determine a user's job role, demographic data, areas of expertise, avocational interests, etc.; (ii) monitor messages displayed in the user's activity-stream; and/or (iii) determine which messages are relevant to the user. The following few paragraphs present an illustrative example.

A database administrator's (DBA's) job role includes responsibility for active maintenance of a cluster of production servers. A message, among many messages, in the DBA's activity-stream indicates that a customer has reported an urgent database issue. The customer's database is hosted on one of the production servers for which the DBA is responsible. A color-coded trending indicator is rendered as a red sparkline next to the first message.

A second message in the DBA's activity-stream indicates that the production servers, including the server on which the customer's database is hosted, are experiencing a power interruption, and a local special work assignment team is working to restore power to the servers. Power to the servers is successfully restored, and the servers are restarted, after a time.

A third message is posted in the DBA's activity-stream indicating that the customer database has been restored and is working correctly. At this time, the color-coded trending indicator becomes green. Further, an arrow icon is displayed, pointing from the third message to the first message. The arrow icon indicates resolution of the production server power interruption.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Sparkline: a relatively small line chart, bar chart, or other type of chart or graph designed to present, in a simple and highly condensed fashion, variation (typically over time) in the value of a measured characteristic, such as a stock market price, or a number of messages logged about a particular topic in a social media network.

Activity-stream: an aggregation of activities (activity-stream items) performed by, or communicated to, an individual, including blog postings, email activity, news feeds, and other aspects of social network communications typically, but not necessarily, taking place on a single website in a social networking context.

User-Centric Data: activity-stream items that have a degree of relevancy with a user, including items that are directed to, generated (at least in part) by, or of interest to a particular user.

Trending indicates relative volume or frequency of discussion about various topics where if a particular event occurs, there is typically a life-cycle to discussions, including activities (postings, emails, links, references, blogging, etc.) in social media, about the event, that increases to a peak level, dwells or fluctuates about a relatively stable level for a length of time, then declines to a low, or negligible level, marking the end of its life-cycle.

What is claimed is:

1. A method comprising:
receiving, by an automatic trending indicating system, a machine readable activity-stream data set that includes:
(i) a plurality of user-centric data items, including a first user-centric data item having a relevance strength exceeding a threshold, relating to a first user profile, wherein the first user profile includes a roles, responsibilities, and relevancy data set, and
(ii) a plurality of trend data sets respectively associated with the plurality of user-centric data items, with each trend data set, of the plurality of trend data sets, being indicative of trending information for a respectively associated activity-stream item; and
creating a machine executable display data set corresponding to a visual presentation displayable by a display device, with the visual presentation including:
(i) a visual indication of the activity-stream data set including the first user-centric data item, and
(ii) a visual indication of a trending information for each respectively corresponding user-centric data item of the activity-stream data set, wherein the visual indication is based on information in the roles, responsibilities, and relevancy data set;

wherein:
the relevance strength for the first user-centric data item is determined based on a user response to a relevancy strength related question posed by the automatic trending indicating system,
a user-centric data item is an activity-stream item that is of interest to a respective user, and
the activity-stream data set is aggregated into a single web page.

2. The method of claim 1 further comprising:
displaying, on the display device through execution of the display data set, at least a portion of the visual presentation of the trending information for each of the respectively corresponding to the activity-stream items of the plurality of activity-stream items, with at least some of the activity-stream items including user-centric data relating to the first user profile;
wherein the plurality of user-centric data items are also activity-stream items.

3. The method of claim 2 wherein the creation of the display data set creates the display data set so that, in the visual presentation, each indication of trend information is located spatially adjacent to its respectively corresponding activity-stream item.

4. The method of claim 3 wherein:
the visual presentation is scrollable in a vertical direction; and
each indication of trend information is located spatially adjacent in a horizontal direction with respect to its respectively corresponding activity-stream item.

5. The method of claim 4 wherein:
each visual indication of trending information has at least one colored portion that has a color which is indicative of an attribute of the trending information.

6. The method of claim 5 wherein the color of the at least one colored portion of at least one visual indication of trending information indicates a level of importance with respect to the user-centric data relating to the first user.

7. The method of claim 5 wherein the color of the at least one colored portion of at least one visual indication of trending information indicates a relationship between a first item of the activity-stream having user-centric data relating to the first user profile and a second item of the activity-stream having user-centric data relating to the first user profile.

8. The method of claim 4 wherein:
each visual indication of trending information has at least one colored portion that has a color which is indicative of an attribute of the trending information; and
a color of the at least one colored portion of a visual indication of trending information indicates a relationship between a first item having user-centric data relating to the first user profile and a second item of the activity-stream having user-centric data relating to the first user profile.

9. The method of claim 8 wherein the color of the at least one colored portion of at least one visual indication of trending information indicates a level of importance with respect to the user-centric data relating to the first user profile.

10. The method of claim 8 wherein the color of the at least one colored portion of at least one visual indication of trending information indicates a relationship between a first item of the activity-stream having user-centric data relating to the first user profile and a second item of the activity-stream having user-centric data relating to the first user profile.

11. The method of claim 1 wherein the visual indication of the trending information is a sparkline.

12. A computer program product comprising a computer readable storage medium having stored thereon:
first program instructions programmed to receive, by an automatic trending indicating system, a machine readable activity-stream data set that includes:
(i) a plurality of user-centric data items, including a first user-centric data item having a relevance strength exceeding a threshold, relating to a first user profile, wherein the first user profile includes a roles, responsibilities, and relevancy data set, and
(ii) a plurality of trend data sets respectively associated with the plurality of user-centric data items, with each trend data set, of the plurality of trend data sets, being indicative of trending information for a respectively associated activity-stream item; and
second program instructions programmed to create a machine executable display data set corresponding to a visual presentation displayable by a display device, with the visual presentation including:
(i) a visual indication of the activity-stream data set including the first user-centric data item, and
(ii) a visual indication of a trending information for each respectively corresponding user-centric data item on information in the roles, responsibilities, and relevancy data set;
wherein:
the relevance strength for the first user-centric data item is determined based on a user response to a relevancy strength related question posed by the automatic trending indicating system,
a user-centric data item is an activity-stream item that is of interest to a respective user, and
the activity-stream data set is aggregated into a single web page.

13. The computer program product of claim 12 further comprising:
third program instructions programmed to display, on the display device through execution of the display data set, at least a portion of the visual presentation of the trending information for each of the respectively corresponding to the activity-stream items of the plurality of activity-stream items, with at least some of the activity-stream items including user-centric data relating to the first user profile.

14. The computer program product of claim 13 wherein the creation of the display data set creates the display data set so that, in the visual presentation, each indication of trend information is located spatially adjacent to its respectively corresponding activity-stream item.

15. The computer program product of claim 14 wherein: each visual indication of trending information has at least one colored portion that has a color which is indicative of an attribute of the trending information.

16. The computer program product of claim 15 wherein the color of the at least one colored portion of at least one visual indication of trending information indicates a level of importance with respect to the user-centric data relating to the first user profile.

17. The computer program product of claim 15 wherein the color of the at least one colored portion of at least one visual indication of trending information indicates a relationship between a first item of the activity-stream having user-centric data relating to the first user profile and a second item of the activity-stream having user-centric data relating to the first user profile.

18. The computer program product of claim 14 wherein: each visual indication of trending information has at least one colored portion that has a color which is indicative of an attribute of the trending information; and
a color of the at least one colored portion of a visual indication of trending information indicates a relationship between a first item having user-centric data relating to the first user profile and a second item of the activity-stream having user-centric data relating to the first user profile.

19. The computer program product of claim 12 wherein the visual indication of the trending information is a sparkline.

20. A computer system comprising:
a processor(s) set; and
a computer readable storage medium;
wherein:
the processor(s) set is structured, located, connected and/or programmed to run program instructions stored on the computer readable storage medium; and
the program instructions include:
first program instructions programmed to receive, by an automatic trending indicating system, a machine readable activity-stream data set that includes:
(i) a plurality of user-centric data items, including a first user-centric data item having a relevance strength exceeding a threshold, relating to a first user profile, wherein the first user profile includes a roles, responsibilities, and relevancy data set, and
(ii) a plurality of trend data sets respectively associated with the plurality of user-centric data items, with each trend data set, of the plurality of trend data sets, being indicative of trending information for a respectively associated activity-stream item; and
second program instructions programmed to create a machine executable display data set corresponding to a visual presentation displayable by a display device, with the visual presentation including:
(i) a visual indication of the activity-stream data set including the first user-centric data item, and
(ii) a visual indication of a trending information for each respectively corresponding user-centric data item of the activity-stream data set, wherein the visual indication is based on information in the roles, responsibilities, and relevancy data set;
wherein:
the relevance strength for the first user-centric data item is determined based on a user response to a relevancy strength related question posed by the automatic trending indicating system,
a user-centric data item is an activity-stream item that is of interest to a respective user, and
the activity-stream data set is aggregated into a single web page.

* * * * *